US008300811B2

(12) United States Patent
Georgiades et al.

(10) Patent No.: US 8,300,811 B2
(45) Date of Patent: Oct. 30, 2012

(54) METHOD AND DEVICE FOR PROCESSING DATA

(75) Inventors: Jean Georgiades, Munich (DE); Anton Kargl, Munich (DE); Bernd Meyer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 352 days.

(21) Appl. No.: 12/634,195

(22) Filed: Dec. 9, 2009

(65) Prior Publication Data

US 2010/0172493 A1    Jul. 8, 2010

(30) Foreign Application Priority Data

Dec. 10, 2008  (DE) ........................ 10 2008 061 483

(51) Int. Cl.
*H04K 1/00* (2006.01)
(52) U.S. Cl. .......................................... 380/30
(58) Field of Classification Search ............... 380/30
See application file for complete search history.

(56) References Cited

U.S. PATENT DOCUMENTS 6,307,935 B1 * 10/2001 Crandall et al. ............... 380/28
2007/0071237 A1   3/2007 Brown et al.

FOREIGN PATENT DOCUMENTS

| DE | 101 61 138 | 7/2003 |
|---|---|---|
| EP | 1 675 300 | 10/2008 |

OTHER PUBLICATIONS

Michael Braun, Erwin Hess und Bernd Meyer, "Using Elliptic Curves on RFID-Tags", International Journal of Computer Science and Network Security, vol. 8, No. 2, pp. 1-9. Feb. 2008; Others.
Menezes J. et al., "Handbook of applied cryptography", Boca Ranton at al., CRC Press, 1997, pp. 78-81; Others.
Zuccherato, Entrust Technologies: Methods for Avoiding the "Small-Subgroup" Attacks on the Diffie-Hellman Key Agreement Method for S/MIME, RFC2785, Internet: http://www.rfc-editor.org/rfc/rfc2785.txt, Mar. 1, 2000; Others.
Knuth D. E.: "The Art of Computer Programming", Oct. 2005, Addison Wesley, vol. 2, pp. 402-407; Others.
Erkay. Savas, et al., "Generating Elliptic Curves of Prime Order," Cryptographic Hardware and Embedded Systems—CHES 2001, No. 2162, May 13-16, 2001, Springer Verlag, Berlin, S., pp. 145-161.
K. Indlekofer, et al., "Largest known Twin Primes and Sophie Germain Primes," Mathematics of Computation, American Mathematical Society, vol. 68, No. 227, Feb. 16, 1999, pp. 1317-1324.
Daniel Brown, et al., "The Static Deffie-Hellman Problem," Eurocrypt, 2005, pp. 1-17.

* cited by examiner

*Primary Examiner* — Cordelia Zecher
(74) *Attorney, Agent, or Firm* — Staas & Halsey LLP

(57) ABSTRACT

The embodiments provides a method for processing data. According to the invention, an elliptic curve with an order m which corresponds to a product of a first cofactor c and a prime number q is provided, wherein the order (q−1) of the multiplicative group of the prime number q corresponds to a product of a second cofactor I and at least two prime divisors $s_1, \ldots, s_k$, wherein the at least two prime divisors $s_1, \ldots, s_k$ are each greater than a predetermined bound of $2^n$; and a chosen method is applied to provided data using the provided elliptic curve for providing cryptographically transformed data. The invention enables cryptographically transformed data to be provided while simultaneously minimizing the probability of a successful attack.

10 Claims, 1 Drawing Sheet

METHOD AND DEVICE FOR PROCESSING DATA

CROSS REFERENCE TO RELATED APPLICATIONS

This application claims the benefits of German Application No. 102008061483.1 filed on Dec. 10, 2008, the application is incorporated by reference herein in its entirety.

BACKGROUND

The embodiments relate to a method and device for processing data, in particular for the cryptographic processing of data.

The technical field of the embodiments relate to the cryptographic processing of data based on elliptic curves.

Cryptographic methods are used inter alia for encrypting messages, signing documents and authenticating persons or objects. Particularly suitable for this purpose are so-called asymmetric encryption methods which provide a user both a private, secretly held key and a public key.

When encrypting a message the sender obtains the public key of the desired addressee and uses it to encrypt the message. Only the addressee is subsequently able to decrypt the message again using the private key that is known only to him/her.

When signing a document a signee calculates an electronic signature from a document by means of his/her private key. Other persons can verify the signature without difficulty with the aid of the signee's public key. However, only signatures that are signed using the associated private key can be verified by means of the public key. Based on this unique assignment and the assumption that the private key is kept secret by the signee, there results a unique assignment of the signature to the signee and the document.

When authenticating by means of a challenge-response protocol, a certification authority transmits a challenge to a person/object and requests the latter to calculate a response using the private key of the person/object and send back said response. A positive authentication results if the certification authority can verify the returned response using the public key of the person/object that is to be checked.

Asymmetric cryptography methods are based, as explained above, on a private and a public key. In such schemes the public key is generated from the private key by means of a predetermined algorithm. It is crucial for the cryptographic methods that a reversal of the process, i.e. determining the private key from the public key, cannot be accomplished within acceptable time limits using the available computing capacities. The latter is assured if the key length of the private key reaches a minimum length. The minimum length of the key is dependent on the algorithms used for the encryption and on the determination of the public key.

The operations using the public or private keys necessitate a certain amount of computing overhead. The latter is dependent on the algorithms used and also on the length of the keys used. It proves advantageous here to employ cryptographic methods based on elliptic curves, since these afford a high level of security with short key lengths. In contrast to other methods, for cryptography methods based on elliptic curves there is no known way to date of determining the private key from the public key where the computing overhead increases more slowly than with exponential increase with increasing key length. In other words, the security gain per additional bit length of the key used is higher than is the case with other methods. Much shorter key lengths can therefore be used for real-world applications.

An elliptic curve E is generally defined by means of a Weierstrass equation, which is written as the following cubic equation:

$$y^2 + a_1 xy + a_3 y = x^3 + a_2 x^2 + a_4 x + a_6.$$

In this case $a_1$ $a_2$ $a_3$ $a_4$ $a_6$ are permanently selected elements of a field K and the pairs (x, y) are called points of the elliptic curve E and satisfy the Weierstrass equation. A finite field K is chosen for the cryptographic methods. Accordingly, the number of points of the elliptic curve E is also finite and is designated in the following as order ord(E) of the curve E. In addition, a formal point at infinity is introduced.

An abelian group structure G can be defined on the set of points of the elliptic curve. The operation of the abelian group structure is designated below as addition and is written additively. The addition of any two points of the elliptic curve uniquely yields a third point of the elliptic curve. In this way it is also possible to define a scalar multiplication, which is defined as a multiple addition of a point to itself. Let P be a point on the elliptic curve E, s a whole number, and Q=sP the s-fold of the point P. Q is likewise a point on the elliptic curve. The determination of the scalar s for given points P and Q is referred to as the discrete logarithm problem for elliptic curves. Given a suitable choice of the field K and the parameters of the elliptic curve E it is impossible to solve the discrete logarithm problem within an acceptable time using currently available computer equipment. This difficulty forms the foundation for the security of cryptographic methods based on elliptic curves.

A communications user chooses a scalar s as his/her private key and keeps this secret. From a starting point P he/she also generates the public key Q as the scalar multiple of the starting point P with the scalar s. There is agreement between the communications users with regard to the starting point P. Owing to the high computational overhead of the discrete logarithm problem it is not possible to determine the private key s from the public key Q and consequently the security of cryptographic methods using elliptic curves is assured. A further requirement to be fulfilled by the elliptic curves is that their order is a large prime number or the product of a large prime number and a small number.

The cryptographic methods represent a compromise between an expected level of security and the computational overhead involved in the encrypting of data. In DE 10161138 A1 it is shown that it is possible to determine the scalar multiple of a point solely on the basis of the x-coordinate, without reference to the y-coordinate. Corresponding computing rules are described for arbitrary fields in DE 10161138 A1. By this means considerably more efficient implementations of the point arithmetic can be achieved, e.g. a Montgomery ladder for the scalar multiplication, a smaller number of field multiplications per point addition and a smaller number of registers for the point representation and the intermediate results. With this method it is not, however, checked as to whether a point is really an element of the elliptic curve.

From this there arises the possibility of carrying out an attack, whereby an x-coordinate of a point can be transmitted to an encryption device, wherein the point does not lie on the elliptic curve. In this regard it is described in DE 10161138 A1 that by this means a partial reconstruction of the private key of the encryption device is possible. To prevent such a side-channel attack, DE 10161138 A1 uses specially selected elliptic curves. The twisted elliptic curves associated with the elliptic curves serve as a criterion in this case. The associated twisted elliptic curve is defined as follows:

$$y^2 + v a_1 xy + a_3 y = x^3 + v a_2 x^2 + v^2 a_4 x + v^3 a_6,$$

where the parameters $a_1, a_2, a_3, a_4, a_6$ are the parameters of the elliptic curves. The parameter v is an arbitrary non-square of the field K if the characteristic of the field K is odd, or an element of the field K with track 1 if the characteristic is 2. According to DE 10161138 A1, all these twisted elliptic curves should also have an order which is a large prime number or the product of a large prime number and a small number.

In their article titled "The Static Diffie-Hellman Problem", the authors Daniel R. L. Brown and Robert P. Gallant describe a further possibility for mounting an attack in order to find out a private key either fully or in part.

The attack on cryptographic methods whose security is based on the discrete logarithm problem in a finite group, as described in the publication "The Static Diffie-Hellman Problem", is applicable in particular to elliptic curves. The attack described can be carried out particularly efficiently when an attacker has at his disposal a device, conventionally called an oracle in the literature, which contains a secret scalar s and when an arbitrary point U is input returns the result of the calculation T=sU, hence the result point T of the scalar multiplication, to the attacker. With this attack, in particular a sequence of points $P_0, P_1, P_2, \ldots, P_n$ on the elliptic curve is required, where $P_i = sP_{i-1}, P_0 = P$ applies.

In a conventional elliptic-curve-based authentication protocol that is known internally to the applicant, a scalar multiplication is computed. The x-coordinate in a randomly chosen projective representation $(X_2, Z_2)$ is returned as the result of said scalar multiplication. Compared to the static Diffie-Hellman attack, the security of the authentication protocol is conventionally based on the properties of the elliptic curve used.

SUMMARY

Against this background an aspect underlying the embodiments discussed herein is to create a solution for providing cryptographically transformed data which makes it more difficult to mount attacks or rules them out in practical terms.

Accordingly a method for processing data is proposed which has the following steps:

a) providing an elliptic curve with an order m which corresponds to a product of a first cofactor c and a prime number q, wherein the order (q−1) of the multiplicative group of the prime number q corresponds to a product of a second cofactor l and at least two prime divisors s1, . . . , sk, wherein the at least two prime divisors s1, . . . , sk are each greater than a predetermined bound 2n; and b) applying, using a computer, a chosen method to provided data using the provided elliptic curve for providing cryptographically transformed data.

Also proposed is a computer program product which initiates the execution of a method as described above on a program-controlled device, such as a computer.

A computer program product such as a computer program can be provided on, for example, a storage medium such as a memory card, USB stick, floppy disk, CD-ROM, or DVD, or also delivered by a server in a network in the form of a downloadable file. The latter can be accomplished for example in a wireless communications network by the transmission of a corresponding file containing the computer program product or the computer program.

Also proposed is a device for processing data which has:

a) a providing mechanism or curve provider, such as a disk storage or ROM, which is configured for the purpose of providing an elliptic curve with an order m which corresponds to a product of a first cofactor c and a prime number q, wherein the order (q−1) of the multiplicative group of the prime number q corresponds to a product of a second cofactor l and at least two prime divisors s1, . . . , sk, wherein the at least two prime divisors s1, . . . , sk are each greater than a predetermined bound 2n; and b) a computing mechanism, such as a computer, which is configured for the purpose of applying a chosen method to provided data using the provided elliptic curve for providing cryptographically transformed data.

The respective mechanisms can be implemented in hardware or in software form. In an implementation in hardware form the respective means can be embodied as a device, for example as a computer or microprocessor, apparatus or else as part of a system, as a computer system, for example. In a software implementation the respective means can be embodied as a computer program product, as a function, as a routine, as part of a program code or as an executable object.

The concept underlying the embodiments essentially involves proposing the use of elliptic curves in order to defend against the static Diffie-Hellman attack for applications with relatively slow evaluation of the oracle, in which elliptic curves the factorization of the order of the multiplicative subgroup of the order of the points group of the elliptic curve has the following form: The factorization includes a relatively small cofactor c and at least two prime divisors s1, . . . , sk, wherein all of said prime divisors s1, . . . , sk are so great that in practical terms it is no longer possible to carry out the attack.

The above-cited advantage will become clear from the following example of a conventionally used elliptic curve which uses a points group with order m on the scale of 2128. If, for example, the order q−1 of the multiplicative group of the prime number q is chosen such that q−1=2.s1.s2, where s1 and s2 are prime numbers of approximately equal length, it henceforth becomes practically impossible to carry out the static Diffie-Hellman attack. The divisors of q−1 are either 2 or contain a large prime divisor s1, s2. On the assumption that 100 authentications per second at most are possible using a conventional IC (Integrated Circuit) and the prime numbers s1, s2 are each greater than 250, more than 250 calculations would be required by the IC for the attack described. These would therefore take more than 356,000 years. Even in the optimal case for the attack, as presented in the publication "The Static Diffie-Hellman Problem", namely that q−1=2.s1.s2.s3, where s1,s2,s3 are each prime numbers greater than 240, the computational duration of the evaluations will still amount to more than 348 years.

This leads to a further advantage of the embodiments to the effect that the set of elliptic curves that are immune against static Diffie-Hellman attacks is increased in size.

According to a preferred development it holds that n=50 or n=55 or n=64 or n=80 or n=128.

According to another preferred development it holds that n>0.9.log 2(q)/k, wherein k, where k≧2, corresponds to the number of prime divisors s1, . . . , sk which are each greater than the predetermined bound of 2n.

According to another preferred development, the elliptic curve and a twisted elliptic curve associated with the elliptic curve are provided in such a way that both each have an order m which corresponds to a respective product of a first cofactor c and a prime number q, wherein the order (q−1) of the multiplicative group of the prime number q corresponds to a product of a second cofactor and at least two prime divisors s1, ..., sk, wherein the at least two prime divisors s1, ..., sk are each greater than a predetermined bound of 2n. An advantage in the use of an elliptic curve as described above and a twisted elliptic curve associated with the elliptic curve lies in the fact that the probability of a successful attack is further minimized.

Elliptic curves over finite fields occur in pairs. This means that so-called twisted curves E'(va1, va2, a3, v2a4, v3a6) always belong to a given elliptic curve E (a1, a2, a3, a4, a6), wherein v is a non-square of the field K if the characteristic of K is odd, or is an element with track 1. The orders of E and an associated twisted curve E' are dependent on one another and satisfy the equation ord(E)+ord(E')=2.ord(K)+2. In particular, ord(E') is not dependent on the concrete choice of the non-square v or of the element with track 1.

In applications of elliptic curves for public key methods, the cryptographic properties of the twisted curves E' associated with E are also of significance. In this regard there is known internally to the applicant a module which is suitable for authentication, encryption, key agreement and the like. The module permits asymmetric cryptographic methods based on elliptic curves to be implemented such that in this way mass applications, such as RFIDs for example, are feasible at low cost using public key cryptography. In order to enable low-cost mass applications, the relatively complicated techniques for applying elliptic curves as described above are preferably simplified in several aspects:

In the above-described module, only the x-coordinates of the points on the elliptic curve are now used. This simplification of the structure results in no disadvantages in security terms, yet permits much more efficient implementations of the point arithmetic, for example: use of the Montgomery ladder for scalar multiplication, smaller number of field multiplications per point addition, smaller number of registers for point representation and intermediate results.

Also made possible in the above-described module is an implicit correctness check for transferred points and parameters. The use of a simple arithmetic logic unit for an extension field of the characteristic 2 is also advantageously provided. Furthermore it is possible to export complex computational steps to the terminal or end-user equipment side.

The simplifications of the cryptography using elliptic curves in the above-described module or device result in an additional requirement to be fulfilled by a cryptographically strong elliptic curve E that is suitable for the module: So that the parameters passed to the module no longer have to be tested in respect of their correctness but are implicitly correct and represent no threat, the twisted curves E' associated with E must preferably also be cryptographically strong.

According to another preferred development, a key exchange protocol based on the provided elliptic curve, for example a Diffie-Hellman key exchange protocol, is chosen as the method for step b).

According to another preferred development, an authentication method based on challenge-response protocols using the provided elliptic curve is chosen as the method for step b).

According to another preferred development, an asymmetric encryption method using the provided elliptic curve is chosen as the method for step b).

According to another preferred development, the first cofactor c is not equal to 1 and relatively small in comparison with the prime number q.

According to another preferred development, the second cofactor 1 is embodied as an even number which is small in comparison with the at least two prime divisors s1, ..., sk.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENTS

Unless explicitly stated otherwise, identical or functionally identical means and devices are labeled with the same reference signs in all the figures.

Figure 1:
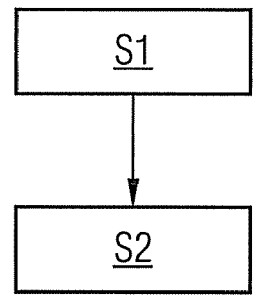
FIG. 1 shows a schematic flowchart of a first exemplary embodiment of the inventive method for processing data.

FIG. 1 shows a schematic flowchart of a first exemplary embodiment of the inventive method for processing data D.

The method according to the embodiments is described below with the aid of the block diagram in FIG. 1 with reference to FIG. 3. The exemplary embodiment of the inventive method according to FIG. 1 has the method steps S1 and S2:

Method Step S1:

An elliptic curve E with an order m, which corresponds to a product of a first cofactor c and a prime number q, is provided, such as by reading same from a disk drive. The order (q−1) of the multiplicative group of the prime number q corresponds to a product of a second cofactor I and at least two prime divisors s1, ..., sk. The at least two prime divisors s1, ..., sk are each greater than a predetermined bound of 2n.

Preferably it holds that n=50 or n=55 or n=64 or n=80 or n=128. Or it holds that n>0.9.log 2(q)/k, wherein k, where k≧2, corresponds to the number of prime divisors s1, ..., sk, which are each greater than the predetermined bound of 2n.

Furthermore, the first cofactor c is relatively small in comparison with the prime number q. The second cofactor I is also embodied as an even number which is small in particular in comparison with the at least two prime divisors s1, ..., sk.

Method Step S2:

A chosen method, in particular a chosen cryptographic method, is applied, for example by using a computer, to provided data using the provided elliptic curve for providing cryptographically transformed data.

For example, a key exchange protocol based on the provided elliptic curve, e.g. a Diffie-Hellman key exchange protocol, can be chosen as the method for step S2.

As another example, an authentication method based on challenge-response protocols using the provided elliptic curve can be chosen as the method.

Furthermore, an asymmetric encryption method using the provided elliptic curve can also be chosen as the method.

Figure 2:
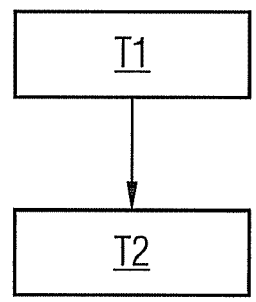
FIG. 2 shows a schematic flowchart of a second exemplary embodiment of the inventive method for processing data.

FIG. 2 shows a schematic flowchart of a second exemplary embodiment of the inventive method for processing data D.

The method according to the embodiments is described below with the aid of the block diagram in FIG. 2 with reference to FIG. 3. The exemplary embodiment of the inventive method according to FIG. 2 has the method steps T1 and T2:

Method Step T1:

An elliptic curve and a twisted elliptic curve associated with the elliptic curve are provided in such a way that both each have an order m which corresponds to a respective product of a first cofactor c and a prime number q, wherein the order (q−1) of the multiplicative group of the prime number q corresponds to a product of a second cofactor and at least two prime divisors s1, . . . , sk, wherein the at least two prime divisors s1, . . . , sk are each greater than a predetermined bound of 2n.

Method Step T2:

A chosen method, in particular a chosen cryptographic method, is applied to provided data using the provided elliptic curve for providing cryptographically transformed data.

Figure 3:
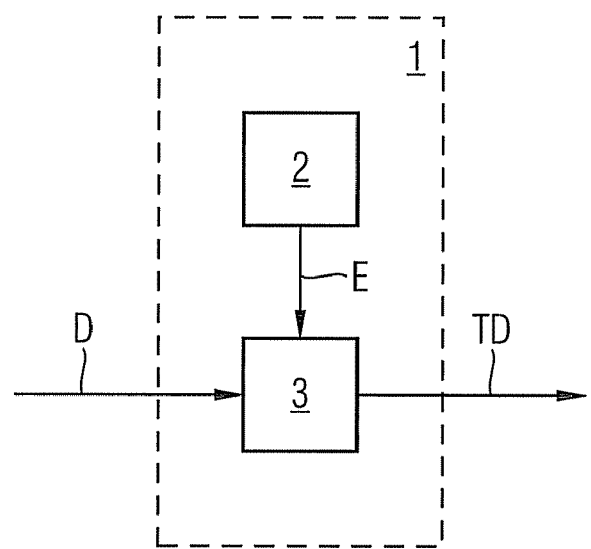
FIG. 3 is a schematic block diagram of an exemplary embodiment of an inventive device for processing data.

FIG. 3 shows a schematic block diagram of an exemplary embodiment of an inventive device 1 for processing data D.

The device 1 for processing data D has a providing mechanism or curve provider 2, such as a disk drive, and a computing mechanism 3, such as a computer. The provider 2 is configured for the purpose of providing an elliptic curve E with an order m which corresponds to a product of a first cofactor c and a prime number q, wherein the order (q−1) of the multiplicative group of the prime number q corresponds to a product of a second cofactor I and at least two prime divisors s1, . . . , sk, wherein the at least two prime divisors s1, . . . , sk are each greater than a predetermined bound of 2n; and the computing mechanism 3 is configured for the purpose of applying a chosen transform method to provided data D using the provided elliptic curve E for providing cryptographically transformed data TD.

Although the embodiments have been described in the foregoing with reference to the preferred exemplary embodiments, it is not restricted thereto, but can be modified in a multiplicity of ways. For example, the described inventive device can be used in an RFID chip.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for processing data, comprising:
providing an elliptic curve with an order m which corresponds to a product of a first cofactor c and a prime number q, wherein an order q−1 of a multiplicative group of the prime number q corresponds to a product of a second cofactor I and at least two prime divisors $s_1, \ldots, s_k$, wherein the at least two prime divisors $s_1, \ldots, s_k$ are each greater than a predetermined bound of $2^n$, and wherein $n > 0.9 \cdot \log_2(q)/k$, wherein $k \geq 2$ and corresponds to the number of prime divisors $s_1, \ldots, s_k$ which are each greater than the predetermined bound of $2^n$; and applying, using a computer, a transform method to provided data using the provided elliptic curve for providing cryptographically transformed data.

2. The method as claimed in claim 1, wherein n=50 or n=55 or n=64 or n=80 or n=128.

3. The method as claimed in claim 1, wherein the elliptic curve and a twisted elliptic curve associated with the elliptic curve are provided such that both have an order m which corresponds to a respective product of the first cofactor c and the prime number q, wherein the order (q−1) of the multiplicative group of the prime number q corresponds to a product of the second cofactor and at least two prime divisors $s_1, \ldots, s_k$, wherein the at least two prime divisors $s_1, \ldots, s_k$ are each greater than a predetermined bound of $2^n$.

4. The method as claimed in claim 1, wherein a key exchange protocol based on the provided elliptic curve comprises the transform method.

5. The method as claimed in claim 1, wherein an authentication method based on challenge-response protocols using the provided elliptic curve comprises the transform method.

6. The method as claimed in claim 1, wherein an asymmetric encryption method using the provided elliptic curve comprises the transform method.

7. The method as claimed in claim 1, wherein the first cofactor c is not equal to 1 and is small in comparison with the prime number q.

8. The method as claimed in claim 7, wherein the second cofactor I is an even number which is small in comparison with the at least two prime divisors $s_1, \ldots, s_k$.

9. A computer program product embodied on a non-transitory computer readable medium and for controlling a program-controlled device and which initiates execution of a method as claimed in claim 1 on the program-controlled device.

10. A device for processing data, comprising:
a curve provider configured to provide an elliptic curve with an order m which corresponds to a product of a first cofactor c and a prime number q, wherein an order q−1 of a multiplicative group of the prime number q corresponds to a product of a second cofactor I and at least two prime divisors $s_1, \ldots, s_k$, wherein the at least two prime divisors $s_1, \ldots, s_k$ are each greater than a predetermined bound of $2^n$; and
a computer configured to apply a transform method to provided data using the provided elliptic curve for providing cryptographically transformed data,
wherein $n > 0.9 \cdot \log_2(q)/k$, wherein $k \geq 2$ and corresponds to the number of prime divisors $s_1, \ldots, s_k$ which are each greater than the predetermined bound of $2^n$.

* * * * *